US012119160B2

(12) United States Patent
Sato et al.

(10) Patent No.: US 12,119,160 B2
(45) Date of Patent: Oct. 15, 2024

(54) COIL COMPONENT

(71) Applicant: TAIYO YUDEN CO., LTD., Tokyo (JP)

(72) Inventors: Natsuko Sato, Tokyo (JP); Takayuki Arai, Tokyo (JP); Atsuko Kasahara, Tokyo (JP); Tomoo Kashiwa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 405 days.

(21) Appl. No.: 17/217,277

(22) Filed: Mar. 30, 2021

(65) Prior Publication Data

US 2021/0304954 A1 Sep. 30, 2021

(30) Foreign Application Priority Data

Mar. 31, 2020 (JP) ................................ 2020-062176

(51) Int. Cl.

*H01F 27/24* (2006.01)
*H01F 27/28* (2006.01)
*H01F 41/04* (2006.01)

(52) U.S. Cl.

CPC ......... *H01F 27/2804* (2013.01); *H01F 27/24* (2013.01); *H01F 41/043* (2013.01); *H01F 2027/2809* (2013.01)

(58) Field of Classification Search

CPC .... H01F 27/2804; H01F 27/24; H01F 41/043; H01F 2027/2809; H01F 17/04; H01F 27/292; H01F 17/0013

See application file for complete search history.

(56) References Cited

U.S. PATENT DOCUMENTS 9,349,512 B2 * 5/2016 Hahn ........................ H01F 3/14
11,056,275 B2 * 7/2021 Kwon ..................... H01F 27/24

(Continued)

FOREIGN PATENT DOCUMENTS

JP 2013-236050 A 11/2013
JP 2018-121023 A 8/2018
WO 2007/088914 A1 8/2007

OTHER PUBLICATIONS

Notice of Reasons for Refusal dated Nov. 28, 2023, issued in corresponding Japanese Patent Application No. 2020-062176 with English translation (8 pgs.).

(Continued)

*Primary Examiner* — Tuyen T Nguyen
(74) *Attorney, Agent, or Firm* — Pillsbury Winthrop Shaw Pittman, LLP

(57) ABSTRACT

A coil component includes an insulating base body and a coil conductor arranged in the base body and having a winding portion extending around a coil axis. The insulating base body includes a magnetic body portion made of a magnetic material and a magnetic gap portion made of a low-permeability material having a lower relative permeability than the magnetic material. The magnetic gap portion is shaped like a ring when seen in a direction along the coil axis and arranged within the winding portion. The magnetic body portion includes a first region positioned within the winding portion, a second region positioned opposite the first region with respect to the magnetic gap portion in the direction along the coil axis, and a third region arranged within a through hole defined by an inner peripheral surface of the magnetic gap portion, where the third region connects together the first and second regions.

9 Claims, 9 Drawing Sheets

(56) References Cited

U.S. PATENT DOCUMENTS

| | | | | |
|---|---|---|---|---|
| 2009/0051476 | A1* | 2/2009 | Tada | H01F 17/0013 336/200 |
| 2011/0128109 | A1 | 6/2011 | Tada et al. | |
| 2013/0271254 | A1 | 10/2013 | Noguchi et al. | |
| 2018/0218822 | A1 | 8/2018 | Yamamoto | |

OTHER PUBLICATIONS

Decision of Refusal dated Apr. 23, 2024, issued in related Japanese Patent Application No. 2020-062176, with English machine translation (8 pgs.).

* cited by examiner

COIL COMPONENT

CROSS-REFERENCE TO RELATED APPLICATIONS

This application is based on and claims the benefit of priority from Japanese Patent Application Serial No. 2020-062176 (filed on Mar. 31, 2020), the contents of which are hereby incorporated by reference in their entirety.

TECHNICAL FIELD

The present disclosure relates to a coil component.

BACKGROUND

There are conventional coil components including a magnetic base body formed of a magnetic material, an external electrode provided on the surface of the magnetic base body, and a coil conductor extending and surrounding a coil axis in the magnetic base body.

Coil components are, for example, inductors. Inductors are passive elements used in electronic circuits. For example, inductors eliminate noise in power source or signal lines.

As disclosed in Japanese Patent Application Publications Nos. 2013-236050 and 2018-121023 (the '023 Publication), a base body may include a magnetic gap layer provided therein in order to prevent magnetic saturation in the base body and improve the DC superimposition characteristics. The magnetic gap layer is made of a low-permeability material having a lower relative permeability than the magnetic material of the base body. A coil component disclosed in the '023 Publication includes a non-magnetic ferrite portion made of a non-magnetic material, which serves as such a magnetic gap. The non-magnetic ferrite portion is a layer-shaped member extending in the direction orthogonal to the coil axis and, as viewed from above, covers the entire region within the winding portion of the coil.

Since the magnetic gap layer is made of a material having a lower relative permeability than the magnetic material of the base body, the magnetic gap layer accounts for degradation in the inductance of the coil component.

SUMMARY

One object of the invention disclosed herein is to prevent the degradation in the inductance of the coil component while improving the DC superimposition characteristics. Other objects of the invention disclosed herein will be apparent with reference to the entire description in this specification. The invention disclosed herein may solve any other drawbacks grasped from the following description, instead of or in addition to the above drawback.

According to one or more embodiments of the present invention, a coil component includes an insulating base body and a coil conductor having a winding portion extending around a coil axis, where the coil conductor is arranged in the base body. The insulating base body includes a magnetic body portion and a magnetic gap portion. The magnetic body portion is made of a magnetic material, and the magnetic gap portion is made of a low-permeability material having a lower relative permeability than the magnetic material. In one or more embodiments, the magnetic gap portion is shaped like a ring when seen in a direction along the coil axis and arranged within the winding portion such that an outer peripheral surface of the magnetic gap portion is in contact with an inner peripheral surface of the winding portion at at least one of top and bottom edges of the winding portion. In one or more embodiments, the magnetic body portion includes a first region positioned within the winding portion, a second region positioned opposite the first region with respect to the magnetic gap portion in the direction along the coil axis, and a third region arranged within a through hole defined by an inner peripheral surface of the magnetic gap portion such that the third region is in contact with the inner peripheral surface of the magnetic gap portion, where the third region connects together the first and second regions.

In one or more embodiments of the present invention, when seen in the direction along the coil axis, a ratio of an area of the magnetic gap portion to an area of a region enclosed within the winding portion is within a range of 0.1 to 0.95.

In one or more embodiments of the present invention, when seen in the direction along the coil axis, the ratio of the area of the magnetic gap portion to the area of the region enclosed within the winding portion is within a range of 0.55 to 0.95.

In one or more embodiments of the present invention, a geometric center of the winding portion is positioned within the through hole when seen in the direction along the coil axis Ax.

In one or more embodiments of the present invention, a relative permeability of the low-permeability material is a tenth part or less of a relative permeability of the magnetic material.

In one or more embodiments of the present invention, the magnetic body portion contains a plurality of metal magnetic particles.

In one or more embodiments of the present invention, the magnetic gap portion includes a first magnetic gap layer and a second gap layer spaced away from the first magnetic gap layer in the direction along the coil axis.

An embodiment of the present invention relates to a circuit board. The circuit board according to one embodiment of the present invention includes the above coil component.

An embodiment of the invention relates to an electronic device. The electronic device relating to one embodiment of the present invention includes the above-described circuit board.

Advantageous Effects

The embodiments of the invention disclosed herein can prevent the degradation in the inductance of the coil component while improving the DC superimposition characteristics.

DESCRIPTION OF THE PREFERRED EMBODIMENTS

The following describes various embodiments of the present invention by referring to the appended drawings as appropriate. The constituents common to more than one drawing are denoted by the same reference signs throughout the drawings. It should be noted that the drawings do not necessarily appear to an accurate scale for the sake of convenience of explanation.

Figure 1:
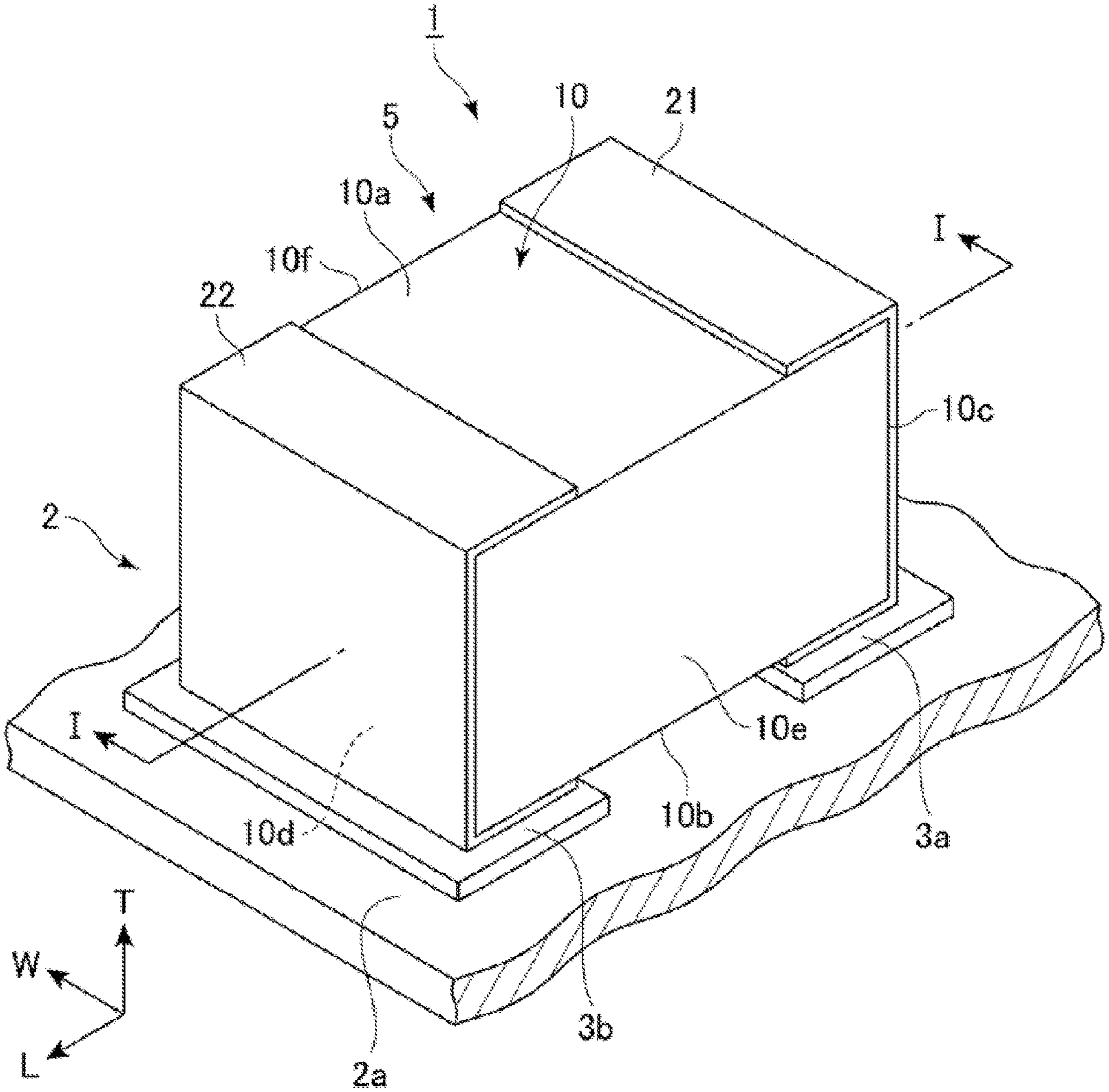
FIG. 1 is a perspective view showing a coil component relating to an embodiment of the invention.

A coil component 1 according to one embodiment of the present invention will be hereinafter described with reference to FIGS. 1 to 3. The coil component 1 is an example coil component to which the present invention is applicable. In the illustrated embodiment, the coil component 1 is a laminated inductor. The laminated inductor may be used as a power inductor incorporated into a power supply line or as other various inductors. The invention may be applied to various coil components, in addition to the laminated inductor illustrated in the drawings.

In the illustrated embodiment, the coil component 1 includes a base body 5 having insulating property, a coil conductor 25 provided in the base body 5 and having a winding portion 25*a* extending around a coil axis Ax, an external electrode 21 disposed on the surface of the base body 5, and an external electrode 22 disposed on the surface of the base body 5 at a position spaced from the external electrode 21. In one or more embodiments of the present invention, the base body 5 includes a magnetic body portion 10 made of a magnetic material and generally shaped like a rectangular parallelepiped and a first magnetic gap portion 31 and a second magnetic gap portion 32 arranged within the magnetic body portion 10. The first and second magnetic gap portions 31 and 32 are arranged inside the winding portion 25*a* when seen in the direction of the coil axis Ax. FIG. 3 shows the boundaries between the first magnetic gap portion 31 and an adjacent portion of the magnetic body portion 10 (specifically, a magnetic layer 11 and a top cover layer 18 described below) and also shows the boundaries between the second magnetic gap portion 32 and an adjacent portion of the magnetic body portion 10 (specifically, magnetic layers 15 and 16 described below). In an actual coil component realized with the present invention, however, the boundaries between the first and second magnetic gap portions 31 and 32 and the respective adjacent portions of the magnetic body portion 10 may not be visible.

The coil component 1 is mounted on a mounting substrate 2*a*. A circuit board 2 includes the coil component 1 and the mounting substrate 2*a* having the coil component 1 mounted thereon. The mounting substrate 2*a* has two land portions 3 provided thereon. The coil component 1 is mounted on the mounting substrate 2*a* by bonding each of the external electrodes 21 and 22 to the corresponding one of the land portions 3 of the mounting substrate 2*a*. The circuit board 2 may include the coil component 1 and other various electronic components.

The circuit board 2 can be installed in various electronic devices. The electronic devices in which the circuit board 2 may be installed include smartphones, tablets, game consoles, electrical components of automobiles, and various other electronic devices. The electronic devices in which the coil component 1 may be installed are not limited to those specified herein.

The magnetic body portion 10 is made of a magnetic material and generally formed in a rectangular parallelepiped shape. The magnetic body portion 10 has a first principal surface 10*a*, a second principal surface 10*b*, a first end surface 10*c*, a second end surface 10*d*, a first side surface 10*e*, and a second side surface 10*f*. The outer surface of the magnetic body portion 10 is defined by these six surfaces. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other. In FIG. 1, the first principal surface 10*a* lies on the top side of the magnetic body portion 10, and therefore, the first principal surface 10*a* may be herein referred to as "the top surface." Similarly, the second principal surface 10*b* may be referred to as "the bottom surface." The coil component 1 is disposed such that the second principal surface 10*b* faces the circuit board 2, and therefore, the second principal surface 10*b* may be herein referred to as "the mounting surface." The top-bottom direction of the coil component 1 refers to the top-bottom direction in FIG. 1. In this specification, a "length" direction, a "width" direction, and a "height" direction of the coil component 1 correspond to the "L axis" direction, the "W axis" direction, and the "T axis" direction in FIG. 1, respectively, unless otherwise construed from the context. The L axis, the W axis, and the T axis are perpendicular to one another. The coil axis Ax extends in the T axis direction. For example, the coil axis Ax passes through the intersection of the diagonal lines of the first principal surface 10*a*, which is rectangularly shaped as seen from above, and extends perpendicularly to the first principal surface 10*a*.

In one or more embodiments of the present invention, the coil component 1 has a length (the dimension in the direction of the L axis) of 0.2 to 6.0 mm, a width (the dimension in the direction of the W axis) of 0.1 to 4.5 mm, and a height (the dimension in the direction of the T axis) of 0.1 to 4.0 mm. These dimensions are mere examples, and the coil component 1 to which the present invention is applicable can have any dimensions that conform to the purport of the present invention. In one or more embodiments, the coil component 1 has a low profile. For example, the coil component 1 has a width larger than the height thereof.

As described above, the magnetic body portion 10 is made of a magnetic material. For example, the magnetic body portion 10 contains a plurality of magnetic powders. The magnetic powders may be, for example, metal magnetic particles or ferrite powders. The metal magnetic particles can be particles or powders of soft magnetic metal materials. The soft magnetic metal materials used to provide the metal magnetic particles are, for example, particles of (1) a metal such as Fe or Ni, (2) an alloy such as Fe—Si—Cr, Fe—Si—Al or Fe—Ni, (3) an amorphous material such as Fe—Si—Cr—B—C or Fe—Si—B—Cr, or (4) a mixture of these. The average particle size of the metal magnetic particles is, for example, 1 μm to 10 μm. The average particle size of the metal magnetic particles is not limited to the range of 1 μm to 10 μm and can be changed as appropriate. The Fe content in the metal magnetic particles may be 85 wt % or larger. An insulating film is provided on the surface of each of the metal magnetic particles contained in the magnetic body portion 10. The insulating film on the surface of the metal magnetic particles may be, for example, an oxide film formed by oxidizing the surface of each of the metal magnetic particles. An insulating coating film may be formed on the surface of each of the metal magnetic particles. The coating film may be, for example, made of silica or a thin film containing silica. The magnetic powders used to form the magnetic body portion 10 include powders of a Ni—Cu—Zn-based ferrite, a Ni—Cu—Zn—Mg-based ferrite, a Cu—Zn-based ferrite, an Ni—Cu-based ferrite, or any other known ferrite materials.

The magnetic body portion 10 may contain a binder for strengthening the binding between the metal magnetic particles. The binder contained in the magnetic body portion 10 may be a highly insulating thermosetting resin, for example, an epoxy resin, a phenolic resin, a polyimide resin, a silicone resin, a polystyrene (PS) resin, a high density polyethylene (HDPE) resin, a polyoxymethylene (POM) resin, a polycarbonate (PC) resin, a polyvinylidene fluoride (PVDF) resin, a polytetrafluoroethylene (PTFE) resin, a polybenzoxazole (PBO) resin, a polyvinyl alcohol (PVA) resin, a polyvinyl butyral (PVB) resin, or an acrylic resin.

Figure 2:
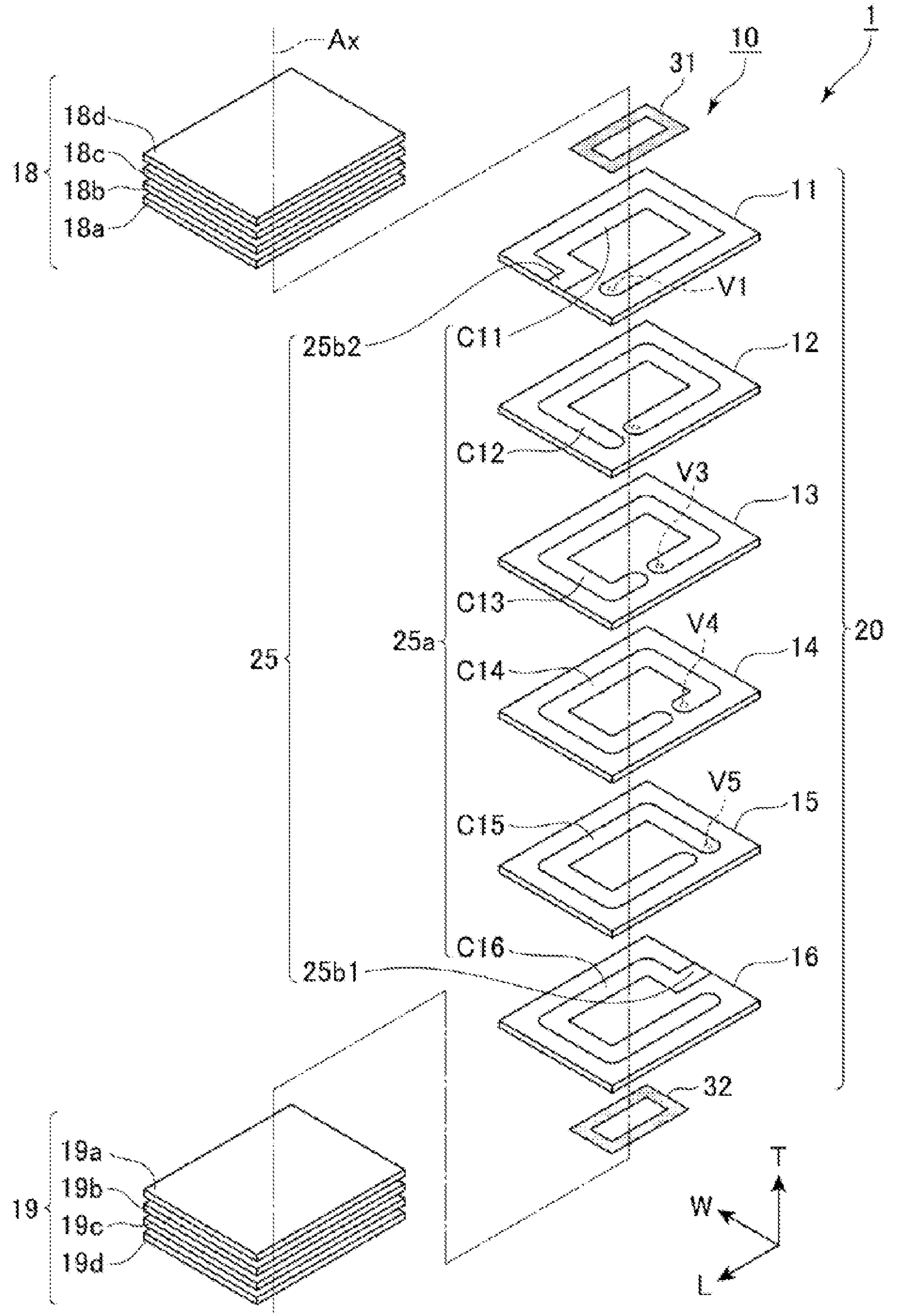
FIG. 2 is an exploded perspective view of the coil component shown in FIG. 1.
Figure 3:
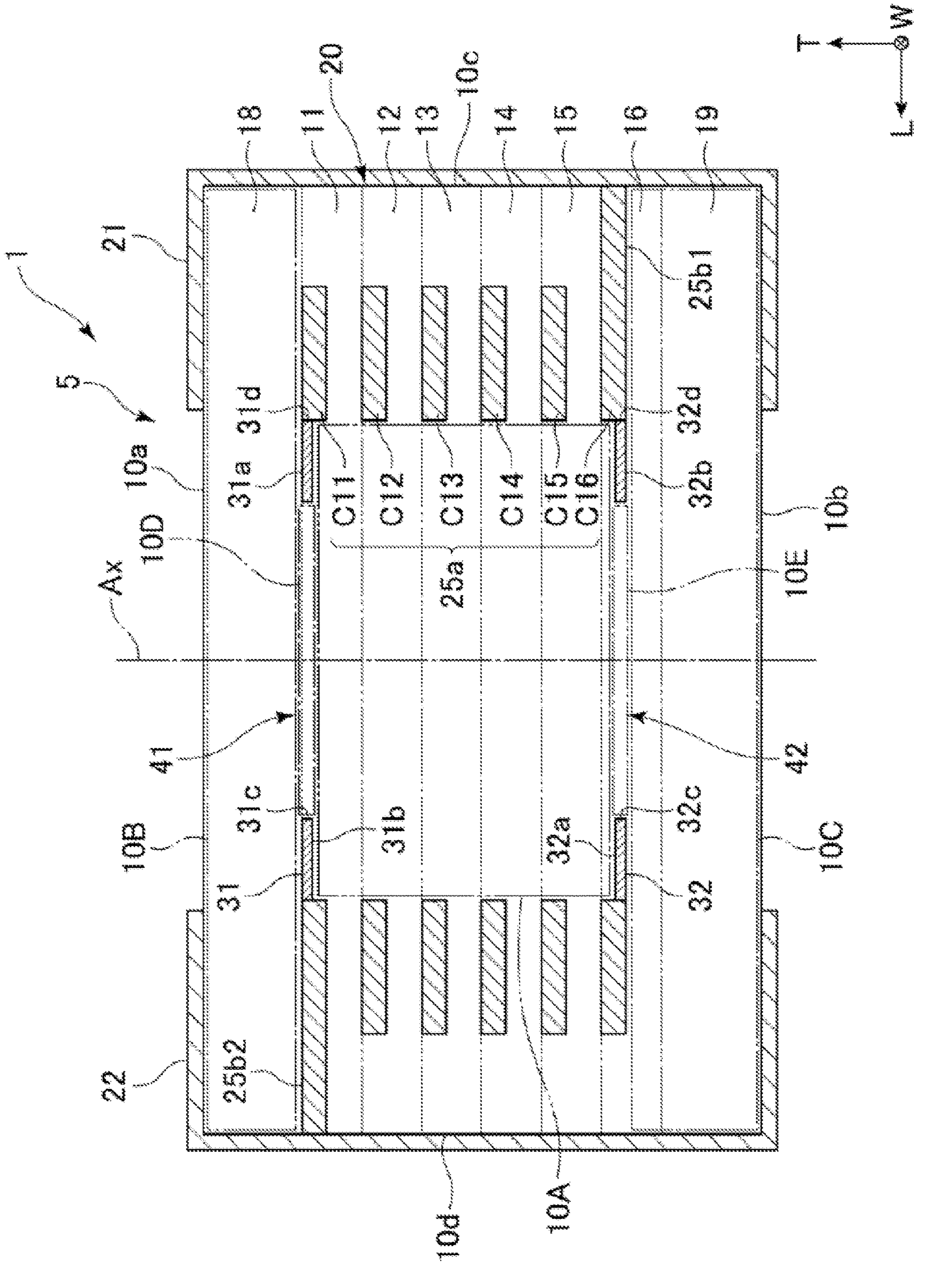
FIG. 3 is a schematic sectional view of the coil component of FIG. 1 along a line I-I in FIG. 1.

As shown in FIGS. 2 and 3, the magnetic body portion 10 includes a plurality of magnetic layers stacked on each other. As shown, the magnetic body portion 10 may include a body portion 20, a top cover layer 18 provided on the top-side surface of the body portion 20, and a bottom cover layer 19 provided on the bottom-side surface of the body portion 20. The body portion 20 includes magnetic layers 11 to 16 stacked together. In the magnetic body portion 10, the top cover layer 18, the magnetic layer 11, the magnetic layer 12, the magnetic layer 13, the magnetic layer 14, the magnetic layer 15, the magnetic layer 16 and the bottom cover layer 19 are stacked in this order from the top to the bottom in FIG. 2.

The top cover layer 18 includes four magnetic layers 18*a* to 18*d*. In the top cover layer 18, the magnetic layer 18*a*, the magnetic layer 18*b*, the magnetic layer 18*c*, and the magnetic layer 18*d* are stacked in this order from the bottom to the top in FIG. 2.

The bottom cover layer 19 includes four magnetic layers 19*a* to 19*d*. In the bottom cover layer 19, the magnetic layer 19*a*, the magnetic layer 19*b*, the magnetic layer 19*c*, and the magnetic layer 19*d* are stacked in this order from the top to the bottom in FIG. 2.

The coil component 1 can include any number of magnetic layers as necessary in addition to the magnetic layers 11 to 16, the magnetic layers 18*a* to 18*d*, and the magnetic layers 19*a* to 19*d*. Some of the magnetic layers 11 to 16, the magnetic layers 18*a* to 18*d*, and the magnetic layers 19*a* to 19*d* can be omitted as appropriate. Although FIG. 3 shows the boundaries between the magnetic layers, such boundaries between the magnetic layers may not be visible in the magnetic body portion 10 of the actual coil component realized with the present invention.

Conductor patterns C11 to C16 are each electrically connected to the respective adjacent conductor patterns through the vias V1 to V6. The conductor patterns C11 to C16 connected in this manner form the spiral winding portion 25*a*. In other words, the winding portion 25*a* of the coil conductor 25 is constituted by the conductor patterns C11 to C16 and the vias V1 to V6.

The magnetic layers 11 to 16 have the conductor patterns C11 to C16 formed thereon, respectively. The conductor patterns C11 to C16 constitute the winding portion 25*a*. The conductor patterns C11 to C16 extend around the coil axis Ax. In the embodiment shown, the coil axis Ax extends in the T axis direction, which is the same as the direction in which the magnetic layers 11 to 16 are stacked on each other.

The end of the conductor pattern C11 opposite to its end connected to the via V1 is connected to the external electrode 22 via a lead-out conductor 25*b*2. The end of the conductor pattern C16 opposite to its end connected to the via V5 is connected to the external electrode 21 via a lead-out conductor 25*b*1. As mentioned, the coil conductor 25 includes the winding portion 25*a*, the lead-out conductor 25*b*1 and the lead-out conductor 25*b*2. In the embodiment shown, the lead-out conductor 25*b*1 is a linear portion of the coil conductor 25 that connects together one of the ends of the conductor pattern C16 and the external electrode 21. Similarly, the lead-out conductor 25*b*2 is a linear portion of the coil conductor 25 that connects together one of the ends of the conductor pattern C11 and the external electrode 22. In one or more embodiments of the present invention, the lead-out conductors 25*b*1 and 25*b*2 may or may not have a curved portion that is curved such that it is wound around the coil axis Ax. When the lead-out conductor 25*b*1 or 25*b*2 has such a curved portion, the curved portion is wound around the coil axis Ax less than a quarter a turn. If a portion of the coil conductor 25 is wound on one of the magnetic layers around the coil axis Ax a quarter a turn or more, such a portion is herein considered to constitute a part of the winding portion 25*a*. The lead-out conductor 25*b*2 and the conductor pattern C11 may be provided on different magnetic layers. For example, another magnetic layer is additionally provided on the magnetic layer 11, and the lead-out conductor 25*b*2 may be provided on the additional magnetic layer. No conductor pattern constituting the winding portion 25*a* is provided on this additional magnetic layer. Similarly, the lead-out conductor 25*b*1 and the conductor pattern C16 may be provided on different magnetic layers. For example, another magnetic layer is additionally provided under the magnetic layer 16, and the lead-out conductor 25*b*1 may be provided on the additional magnetic layer. No conductor pattern constituting the winding portion 25*a* is provided on this additional magnetic layer.

The conductor patterns C11 to C16 are each formed on a corresponding one of the magnetic layers 11 to 16. The conductor patterns C11 to C16 are formed by printing such as screen printing, plating, etching, or any other known method. The magnetic layers 11 to 15 respectively have vias V1 to V5 formed therein at a predetermined position. The vias V1 to V5 are obtained by forming a through-hole at the predetermined position in the magnetic layers 11 to 15 so as to extend through the magnetic layers 11 to 15 in the T axis direction and filling the through-holes with a conductive material. The conductor patterns C11 to C16 and the vias V1 to V5 contain a highly conductive metal, such as Ag, Pd, Cu, or Al, or any alloy of these metals.

As noted, the coil conductor 25 has the winding portion 25*a* extending around the coil axis Ax and is accommodated within the magnetic body portion 10. While the lead-out conductors 25*b*1 and 25*b*2 of the coil conductor 25 have ends exposed outside the magnetic body portion 10, the remaining portion of the coil conductor 25 is positioned inside the magnetic body portion 10.

Figure 4:
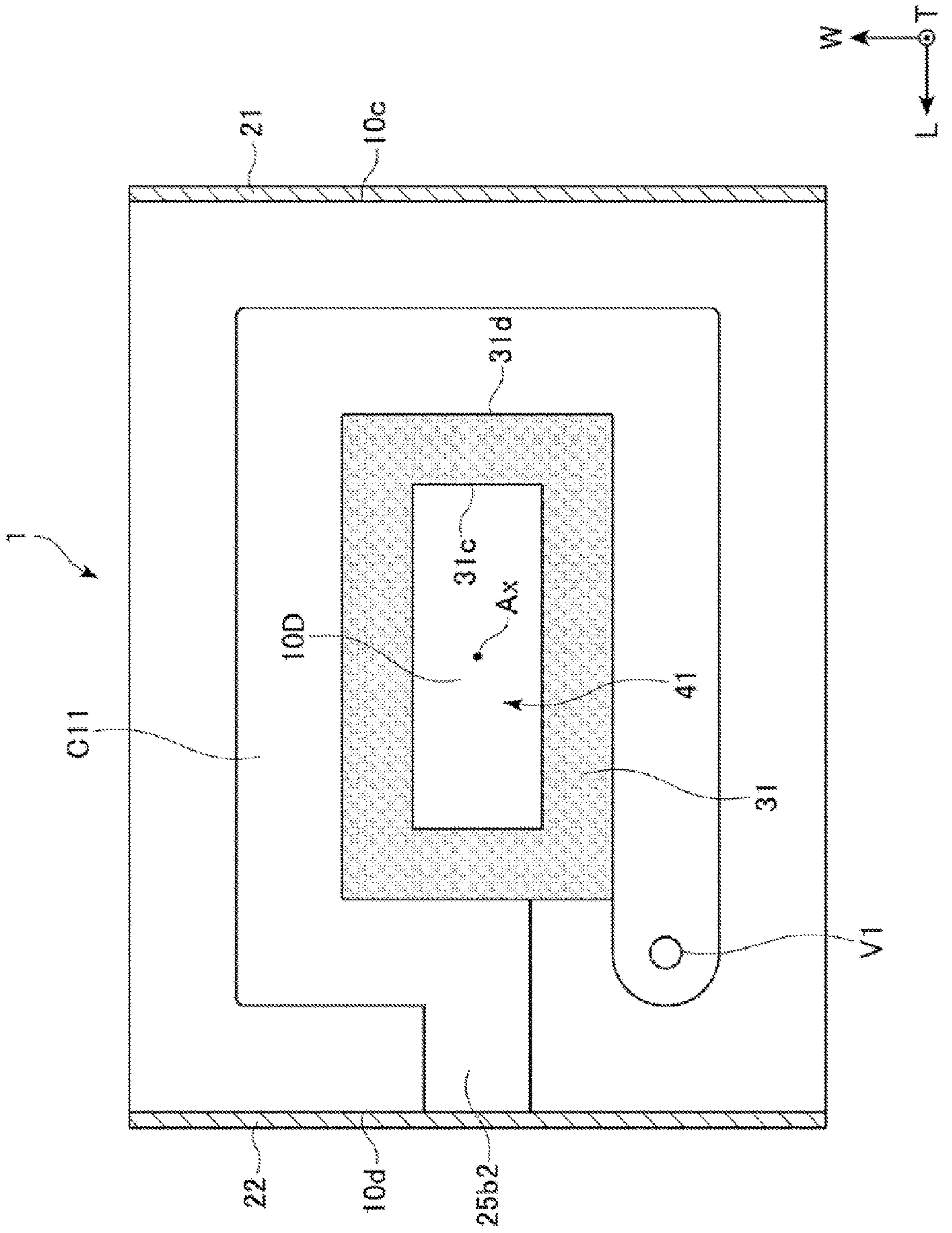
FIG. 4 is a schematic plan view of the coil component shown in FIG. 1.

The following describes the first and second magnetic gap portions 31 and 32 with reference to FIGS. 3 and 4. In one or more embodiments of the present invention, the first and second magnetic gap portions 31 and 32 are made of a low-permeability material and shaped like a plate. As used herein, the low-permeability material used to form the first and second magnetic gap portions 31 and 32 exhibits a relative permeability which is a tenth part or less of the relative permeability of the magnetic body portion 10. The low-permeability material for forming the first and second magnetic gap portions 31 and 32 may be a non-magnetic material. The low-permeability material for forming the first and second magnetic gap portions 31 and 32 may be, for example, glass, ceramics, non-magnetic ferrite and other known materials exhibiting a relative permeability that is a tenth part or less of the relative permeability of the magnetic material of the magnetic body portion 10, a mixture of these or a mixture of these and a magnetic material. For example, the first and second magnetic gap portions 31 and 32 may be made of a resin mixture obtained by mixing together metal magnetic particles and a resin. In one or more embodiments of the present invention, the relative permeability of the base body 10 is, for example, within a range of 10 to 50. The magnetic body portion 10 may have a relative permeability of 35 or more. The first and second magnetic gap portions 31 and 32 have a relative permeability within a range of 1 to 10, for example.

In one or more embodiments of the present invention, the first magnetic gap portion 31 may be obtained by printing on the top surface of the magnetic layer 11 a resin paste produced by mixing and kneading a low-permeability material with a binder resin and a solvent. Likewise, the second magnetic gap portion 32 may be obtained by printing on the top surface of the magnetic layer 16 a resin paste produced by mixing and kneading a low-permeability material with a binder resin and a solvent. The first and second magnetic gap portions 31 and 32 may be formed by mixing and kneading a low-permeability material with a binder resin and a solvent to produce a resin paste, processing the resin paste into a sheet of the low-permeability material using a known technique such as a doctor blade method, and placing the sheet on the top surface of each of the magnetic layers 11 and 16.

In one or more embodiments of the present invention, the first and second magnetic gap portions 31 and 32 are spaced away from each other in the direction along the coil axis Ax (the T axis direction). As best seen in FIG. 3, the position of the first magnetic gap portion 31 in the direction along the coil axis Ax is at the same level as the position of the conductor pattern C11, which is the uppermost one of the conductor patterns C11 to C16 constituting the winding portion 25*a*, in one or more embodiments of the present invention. In other words, in the three-dimensional coordinate space defined by the W, L and Taxes, the T-axis coordinate of the first magnetic gap portion 31 is equal to the T-axis coordinate of the conductor pattern C11. Similarly, the position of the second magnetic gap portion 32 in the direction along the coil axis Ax is at the same level as the position of the conductor pattern C16, which is the lowermost one of the conductor patterns C11 to C16 constituting the winding portion 25*a*. In other words, in the three-dimensional coordinate space defined by the W, L and Taxes, the T-axis coordinate of the second magnetic gap portion 32 is equal to the T-axis coordinate of the conductor pattern C16.

In the embodiment illustrated, the first magnetic gap portion 31 is arranged such that a top surface 31*a* of the first magnetic gap portion 31 is flush with the top surface of the conductor pattern C11 (i.e., the top edge of the winding portion 25*a*). The positioning of the first magnetic gap portion 31 is not limited to the illustrated. In one or more embodiments of the present invention, the first magnetic gap portion 31 may be positioned such that the T-axis coordinate of the top surface 31*a* falls between the T-axis coordinate of the top surface of the conductor pattern C11 and the T-axis coordinate of the bottom surface of the conductor pattern C11. Stated differently, the first magnetic gap portion 31 may be positioned such that the top surface 31*a* thereof is away from the top surface of the conductor pattern C11 in the T-axis direction toward the negative side by a distance equal to or less than the thickness of the conductor pattern C11. In one or more embodiments of the present invention, the first magnetic gap portion 31 may be positioned such that the T-axis coordinate of its bottom surface 31*b* falls between the T-axis coordinate of the top surface of the conductor pattern C11 and the T-axis coordinate of the bottom surface of the conductor pattern C11. Stated differently, the first magnetic gap portion 31 may be positioned such that the bottom surface 31*b* thereof ids away from the bottom surface of the conductor pattern C11 in the T-axis direction toward the positive side by a distance equal to or less than the thickness of the conductor pattern C11.

In the embodiment illustrated, the second magnetic gap portion 32 is arranged such that a bottom surface 32*b* of the second magnetic gap portion 32 is flush with the bottom surface of the conductor pattern C16 (i.e., the bottom edge of the winding portion 25*a*). The positioning of the second magnetic gap portion 32 is not limited to the illustrated. In one or more embodiments of the present invention, the second magnetic gap portion 32 may be positioned such that the T-axis coordinate of the bottom surface 32*b* falls between the T-axis coordinate of the top surface of the conductor pattern C16 and the T-axis coordinate of the bottom surface of the conductor pattern C16. Stated differently, the second magnetic gap portion 32 may be positioned such that the bottom surface 32*b* thereof is away from the bottom surface of the conductor pattern C16 in the T-axis direction toward the positive side by a distance equal to or less than the thickness of the conductor pattern C16. In one or more embodiments of the present invention, the second magnetic gap portion 32 may be positioned such that the T-axis coordinate of its top surface 32*a* falls between the T-axis coordinate of the top surface of the conductor pattern C16 and the T-axis coordinate of the bottom surface of the conductor pattern C16. Stated differently, the second magnetic gap portion 32 may be positioned such that the top surface 32*a* thereof is away from the top surface of the conductor pattern C16 in the T-axis direction toward the negative side by a distance equal to or less than the thickness of the conductor pattern C16.

As described above, the lead-out conductor 25*b*2 may be provided on a magnetic layer above the magnetic layer 11, on which the uppermost layer of the winding portion 25*a* or the conductor pattern C11 is provided. In this case, in the direction along the coil axis Ax, the first magnetic gap portion 31 is not positioned at the same level as the lead-out conductor 25*b*2 but positioned at the same level as the conductor pattern C11, which is equivalent to the top edge of the winding portion 25*a*. Similarly, the lead-out conductor 25*b*1 may be provided on a magnetic layer below the magnetic layer 16, on which the lowermost layer of the winding portion 25*a* or the conductor pattern C16 is provided. In this case, in the direction along the coil axis Ax, the second magnetic gap portion 32 is not positioned at the same level as the lead-out conductor 25*b*1 but positioned at the same level as the conductor pattern C16, which is equivalent to the bottom edge of the winding portion 25*a*.

As used herein, "a core region 10A" denotes a region of the magnetic body portion 10 that is positioned inside the winding portion 25*a* when seen in the coil axis Ax direction (i.e., when seen from the perspective of FIG. 4) and that is sandwiched between the bottom surface 31*b* of the first magnetic gap portion 31 and the top surface 32*a* of the second magnetic gap portion 32 in the cross-section passing through the coil axis Ax (for example, in the cross-section shown in FIG. 3). The core region 10A extends, in the T-axis direction, between the bottom surface 31*b* of the first magnetic gap portion 31 and the top surface 32*a* of the second magnetic gap portion 32. When the first magnetic gap portion 31 is not provided, the core region 10A extends between the top surface of the conductor pattern C11, which forms the uppermost layer of the winding portion 25*a*, and the top surface 32*a* of the second magnetic gap portion 32. Similarly, when the second magnetic gap portion 32 is not provided, the core region 10A extends between the bottom surface 31*b* of first magnetic gap portion 31 and the bottom surface of the conductor pattern C16, which forms the lowermost layer of the winding portion 25*a*. A top cover region 10B and a bottom cover region 10C are also defined. The top cover region 10B represents the region in the magnetic body portion 10 above the top surface of the conductor pattern C11 (the region on the positive side in the T-axis direction), and the bottom cover region 10C represents the region in the magnetic body portion 10 below the bottom surface of the conductor pattern C16 (the region on the negative side in the T-axis direction). In the embodiment illustrated, the top cover region 10B is equivalent to the top cover layer 18, and the bottom cover region 10C includes the bottom cover layer 19 and the magnetic layer 16. The top cover region 10B is positioned opposite the core region 10A with respect to the first magnetic gap portion 31. The bottom cover region 10C is positioned opposite the core region 10A with respect to the second magnetic gap portion 32.

In one or more embodiments of the present invention, the thickness (the size in the T-axis direction) of the first and second magnetic gap portions 31 and 32 may be a tenth part or less of the thickness of the core region 10A (the size in the T-axis direction). As the ratio in thickness of the first and second magnetic gap portions 31 and 32 to the core region 10A decreases, the ratio in volume of the core region 10A, which is made of a magnetic material, in the region enclosed within the winding portion 25*a* may increase. This can reduce the degradation in the inductance of the coil component 1, which may be caused by the first and second magnetic gap portions 31 and 32. In particular, when the magnetic body portion 10 has a relative permeability of 40 or more, the ratio in thickness of each of the first and second magnetic gap portions 31 and 32 to the core region 10A can be 1/10 or less. The first and second magnetic gap portions 31 and 32 can be each 10 μm or less in thickness. The drop in inductance can be reduced by including the first magnetic gap portion 31 having a thickness of 10 μm or less and/or including the second magnetic gap portion 32 having a thickness of 10 μm or less.

In one or more embodiments of the present invention, the first magnetic gap portion 31 has a through hole 41 formed therein extending in the direction along the coil axis Ax. The through hole 41 penetrates through the first magnetic gap portion 31. This through hole 41 is defined by an inner peripheral surface 31*c* of the first magnetic gap portion 31. The first magnetic gap portion 31 has an outer peripheral surface 31*d* facing the inner peripheral surface 31*c*, and the first magnetic gap portion 31 is at the outer peripheral surface 31*d* in contact with the inner peripheral surface of the conductor pattern C11. As noted, the first magnetic gap portion 31 is arranged with no space being provided between itself and the inner peripheral surface of the conductor pattern C11. The through hole 41 is closed by a connecting region 10D, which is a portion of the magnetic body portion 10. The connecting region 10D constitutes a part of the magnetic body portion 10 and connects together the core region 10A and the top cover region 10B. In other words, the core region 10A and the top cover region 10B of the magnetic body portion 10 are connected to each other through the connecting region 10D, which closes the through hole 41. The connecting region 10D is in contact with the inner peripheral surface 31*c* of the first magnetic gap portion 31. The connecting region 10D is positioned within the through hole 41 as viewed in the coil axis Ax direction (in the planar view shown in FIG. 4).

In one or more embodiments of the present invention, the second magnetic gap portion 32 has a through hole 42 formed therein extending in the direction along the coil axis Ax. The through hole 42 penetrates through the second magnetic gap portion 32. This through hole 42 is defined by an inner peripheral surface 32*c* of the second magnetic gap portion 32. The second magnetic gap portion 32 has an outer peripheral surface 32*d* facing the inner peripheral surface 32*c*, and the second magnetic gap portion 32 is at the outer peripheral surface 32*d* in contact with the inner peripheral surface of the conductor pattern C16. As noted, the second magnetic gap portion 32 is arranged with no space being provided between itself and the inner peripheral surface of the conductor pattern C16. The through hole 42 is closed by a connecting region 10E, which is a portion of the magnetic body portion 10. The connecting region 10E constitutes a part of the magnetic body portion 10 and connects together the core region 10A and the bottom cover region 10C. In other words, the core region 10A and the bottom cover region 10C of the magnetic body portion 10 are connected to each other through the connecting region 10E, which closes the through hole 42. The connecting region 10E is in contact with the inner peripheral surface 32*c* of the second magnetic gap portion 32. The connecting region 10E is positioned within the through hole 42 as viewed in the coil axis Ax direction.

As described above, the magnetic body portion 10 is partitioned into a plurality of regions. In one or more embodiments of the present invention, the connecting regions 10D and 10E have a relative permeability of 35 or more. If the connecting regions 10D and 10E have a relative permeability of 35 or more, the coil component 1 can easily realize a required high effective permeability even with a large thickness of the first and second magnetic gap portions 31 and 32. If the core region 10A has a relative permeability of 35 or more, the first and second magnetic gap portions 31 and 32 are allowed to have a thickness of, for example, 5 μm or more. If the first and second magnetic gap portions 31 and 32 have a large thickness (for example, 5 μm or more), this can reduce a change in effective permeability of the coil component 1, which may result from inevitable manufacturing-process-induced variability in thickness of the first and second magnetic gap portions 31 and 32.

As described above, in the planar view (i.e., as viewed in the coil axis Ax direction), the first magnetic gap portion 31 is shaped like a ring such that its outer peripheral surface is in contact with the inner peripheral surface of the conductor pattern C11, and the second magnetic gap portion 32 is shaped like a ring such that its outer peripheral surface is in contact with the inner peripheral surface of the conductor pattern C16.

Figure 9:
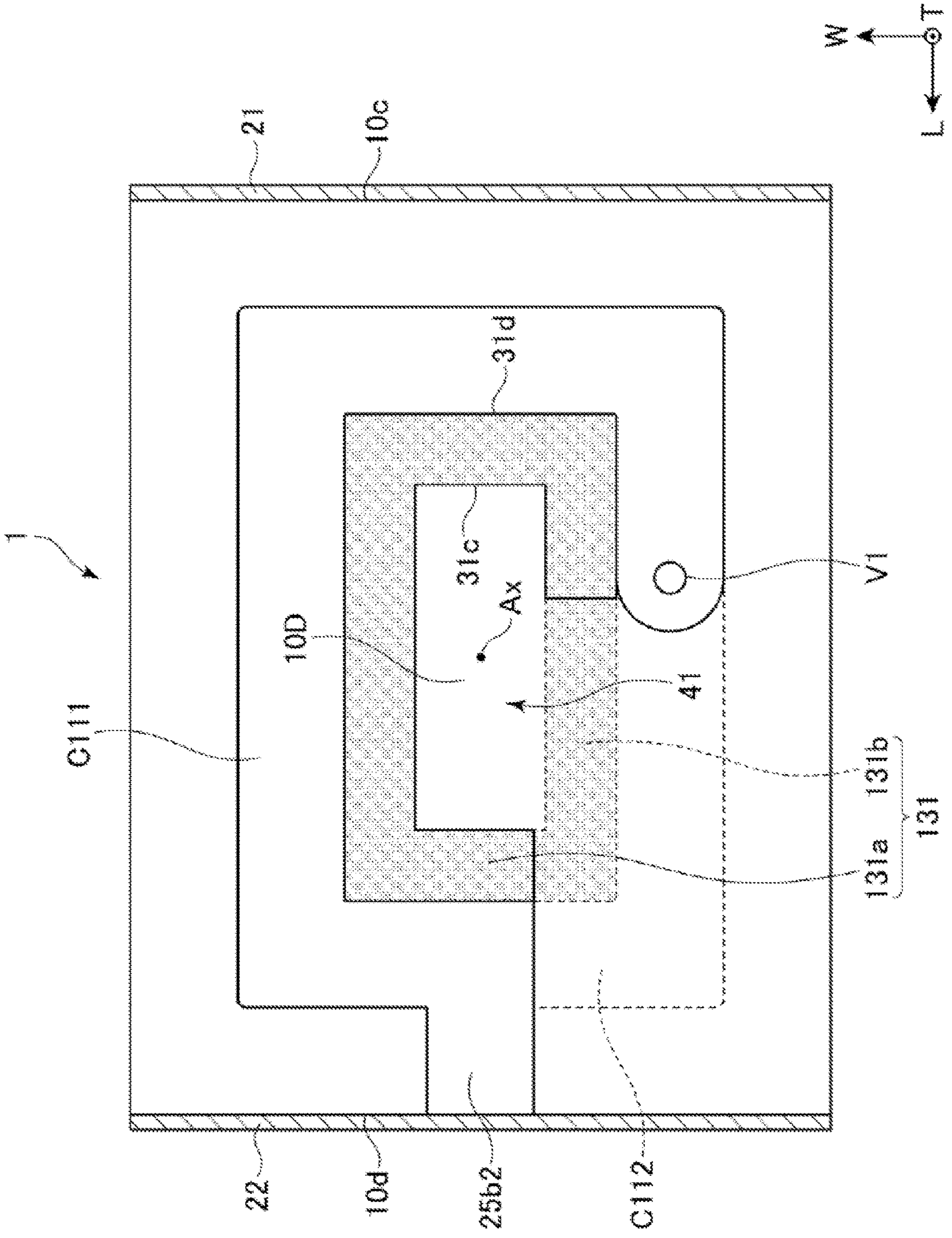
FIG. 9 is a plan view schematically showing a coil component according to another embodiment of the present invention.

In one or more embodiments of the present invention, at least one of the first and second magnetic gap portions 31 and 32 may be shaped so as to extend over more than one layer. FIG. 9 is a plan view showing the coil component 1 including a first magnetic gap portion shaped so as to extend over two layers. The coil component 1 shown in FIG. 9 is different from the coil component 1 shown in FIG. 4 in that the first magnetic gap portion 31 is replaced with a first magnetic gap portion 131 and the conductor patterns C11 and C12 are respectively replaced with conductor patterns C111 and C112. More specifically, while the uppermost conductor pattern C11 shown in FIG. 4 is wound approximately one turn around the coil axis Ax, the uppermost conductor pattern C111 shown in FIG. 9 is wound only approximately ¾ turn around the coil axis Ax (i.e., only approximately 270° around the coil axis Ax). The conductor pattern C112 is connected to the conductor pattern C111 through a via V1. In one or more embodiments, the conductor pattern C112 is wound around the coil axis Ax the same number of turns as the conductor pattern C111. In the example shown in FIG. 9, the conductor pattern C112 is wound ¾ turn around the coil axis Ax.

In one or more embodiments of the present invention, a top-side first magnetic gap portion 131*a* is shaped such that its outer peripheral surface is in contact with the inner peripheral surface of the conductor pattern C111 and such that it is wound only ¾ turn around the coil axis Ax. In other words, the top-side first magnetic gap portion 131*a* is shaped like a partial ring, or partially missing in the circumferential direction.

The first magnetic gap portion 131 includes the top-side first magnetic gap portion 131*a* and a bottom-side first magnetic gap portion 131*b*. The top-side first magnetic gap portion 131*a* is positioned at the same level as the conductor pattern C111 in the direction along the coil axis Ax, and the bottom-side first magnetic gap portion 131*b* is positioned at the same level as the conductor pattern C112 in the direction along the coil axis Ax. In other words, the T-axis coordinate of the top-side first magnetic gap portion 131*a* is equal to the T-axis coordinate of the conductor pattern C111, and the T-axis coordinate of the bottom-side first magnetic gap portion 131*b* is equal to the T-axis coordinate of the conductor pattern C112. This means that the top-side first magnetic gap portion 131*a* is differently positioned from the bottom-side first magnetic gap portion 131*b* in the T-axis direction.

In one or more embodiments of the present invention, the bottom-side first magnetic gap portion 131*b* extends around the coil axis Ax such that its outer peripheral surface is in contact with a part or whole of the inner peripheral surface of the conductor pattern C112. In one or more embodiments of the present invention, when combined together, the top-side first magnetic gap portion 131*a* and the bottom-side first magnetic gap portion 131*b* are shaped like a ring such that they entirely surround the coil axis Ax as the coil component 1 is viewed from above in the coil axis Ax (i.e., from the perspective of FIG. 9). For example, as shown in FIG. 9, when the top-side first magnetic gap portion 131*a* surrounds the coil axis Ax ¾ turn, the bottom-side first magnetic gap portion 131*b* is arranged so as to cover the remaining ¼ turn, which is not covered by the top-side first magnetic gap portion 131*a* as viewed from above. According to such design, when the coil component 1 is seen from above, the first magnetic gap portion 131 including the top-side and bottom-side first magnetic gap portions 131*a* and 131*b* entirely surrounds the coil axis Ax. When the present disclosure states that the first magnetic gap portion 131 is shaped like a ring as viewed in the coil axis Ax direction (or when seen from above), this may mean that the top-side and bottom-side first magnetic gap portions 131*a* and 131*b* constituting the first magnetic gap portion 131 each extend less than one turn around the coil axis Ax provided that, when seen in the coil axis Ax direction as shown in FIG. 9, the first magnetic gap portion 131 entirely surrounds the coil axis Ax.

In one or more embodiments of the present invention, the second magnetic gap portion may be shaped so as to extend over more than one layer, like the first magnetic gap portion. The description made for the first magnetic gap portion 31 is also true to the first magnetic gap portion 131, as long as no contradictions arise. The description made for the second magnetic gap portion 32 is also true to a second magnetic gap portion extending over two layers, as long as no contradictions arise.

In the illustrated embodiment, the outer peripheral surfaces 31*d* and 32*d* of the first and second magnetic gap portions 31 and 32 are shaped like a rectangle when seen from above, and their inner peripheral surfaces 31*c* and 32*c* are also shaped like a rectangle. Since the inner peripheral surfaces 31*c* and 32*c* of the first and second magnetic gap portions 31 and 32 are shaped like a rectangle, the connecting regions 10D and 10E are similarly shaped like a rectangle. The illustrated shapes of the first and second magnetic gap portions 31 and 32 when seen from above are only examples, and, when seen from above, the shapes of the first and second magnetic gap portions 31 and 32 worked with the present invention are not limited to the illustrated examples. For example, when seen from above, the shape of the outer peripheral surface 31*d* of the first magnetic gap portion 31 can be, in addition to a rectangle, an oval, an ellipse, a circle, a polygon other than a rectangle, and other shapes. Likewise, the illustrated shape of the inner peripheral surfaces 31*c* and 32*c* of the first and second magnetic gap portions 31 and 32, in other words, the illustrated shape of the through holes 41 and 42 when seen from above is also merely an example. The shape of the inner peripheral surfaces 31*c* and 32*c* of the first and second magnetic gap portions 31 and 32 worked with the present invention when seen from above, in other words, the shape of the through holes 41 and 42 when seen from above is not limited to the illustrated one and can be, in addition to a rectangle, an oval, an ellipse, a circle, a polygon other than a rectangle, and other shapes, for example. When seen from above, the shape of the outer peripheral surface 31*d* of the first magnetic gap portion 31 and the shape of the inner peripheral surface 31*c* of the first magnetic gap portion 31 may or may not be similar shapes. Likewise, when seen from above, the shape of the outer peripheral surface 32*d* of the second magnetic gap portion 32 and the shape of the inner peripheral surface 32*c* of the second magnetic gap portion 32 may or may not be similar shapes. If the shapes of the outer and inner peripheral surfaces 31*d* and 31*c* are similar, a uniform magnetic flux distribution can be obtained in the core region 10A. If the shapes of the outer and inner peripheral surfaces 32*d* and 32*c* are similar, a uniform magnetic flux distribution can be obtained in the core region 10A.

In one or more embodiments of the present invention, the ratio of the area of each of the first and second magnetic gap portions 31 and 32 to a core area or the area of the region enclosed within the inner peripheral surface of the winding portion 25*a* falls within the range of 0.1 to 0.95. In one or more embodiments of the present invention, the ratio of the area of each of the first and second magnetic gap portions 31 and 32 to the area of the region enclosed within the inner peripheral surface of the winding portion 25*a* falls within the range of 0.55 to 0.95. In one or more embodiments of the present invention, the ratio of the area of each of the first and second magnetic gap portions 31 and 32 to the area of the region enclosed within the inner peripheral surface of the winding portion 25*a* falls within the range of 0.8 to 0.95. As for the area of the region enclosed within the inner peripheral surface of the winding portion 25*a* and the area of the first and second magnetic gap portions 31 and 32, the area in the planar view (as viewed in the T-axis direction) is denoted unless otherwise specified. The area of the first magnetic gap portion 31 is equal to the result of excluding the area of the through hole 41 from the region enclosed within the outer peripheral surface 31*d*, and the area of the second magnetic gap portion 32 is equal to the result of excluding the area of the through hole 42 from the region enclosed within the outer peripheral surface 32*d*.

In one or more embodiments of the present invention, the through hole 41 is positioned in the magnetic gap portion 31 such that the geometric center of the winding portion 25*a* is accommodated within the through hole 41 when seen in the coil axis Ax direction. For example, in the illustrated embodiment, the first magnetic gap portion 31 has a rectangular shape. Since the geometric center of the rectangle is the intersection of the diagonal lines of the rectangle, the through hole 41 is formed in the first magnetic gap portion 31 such that, when seen in the coil axis Ax direction, the geometric center or the intersection of the diagonal lines of the first magnetic gap portion 31 is positioned within the through hole 41. If the first magnetic gap portion 31 has an oval shape, the geometric center is the middle point between the two focal points of the oval. The geometric center of the first magnetic gap portion 31 depends on the shape of the first magnetic gap portion 31. The geometric center of the first magnetic gap portion 31 can be identified by capturing the image of a section of the coil component 1 obtained by cutting the coil component 1 along a plane perpendicular to the coil axis Ax and passing through the first magnetic gap portion 31 and analyzing the captured image. The through hole 42 can be positioned in the same manner as the through hole 41. To be specific, the through hole 42 is positioned in the second magnetic gap portion 32 such that the geometric center of the winding portion 25*a* is accommodated within the through hole 42 when seen in the coil axis Ax direction in one or more embodiments of the present invention.

In one or more embodiments of the present invention, the region enclosed within the outer peripheral surface 31*d* of the first magnetic gap portion 31 and the through hole 41 may have similar figures. In one or more embodiments of the present invention, the geometric center of the region enclosed within the outer peripheral surface 31*d* of the first magnetic gap portion 31 may coincide with or substantially coincide with the geometric center of the through hole 41. When the distance between the geometric center of the region enclosed within the outer peripheral surface 31*d* of the first magnetic gap portion 31 and the geometric center of the through hole 41 is equal to or less than 10% of the dimension of the magnetic gap portion 31 in the L-axis direction, this can indicate that the geometric center of the region enclosed within the outer peripheral surface 31*d* of the first magnetic gap portion 31 substantially coincides with the geometric center of the through hole 41. This relation between the region enclosed within the outer peripheral surface 31*d* of the first magnetic gap portion 31 and the through hole 41 is also true to the relation between the region enclosed within the outer peripheral surface 32*d* of the second magnetic gap portion 32 and the through hole 42. In other words, in one or more embodiments of the present invention, the geometric center of the region enclosed within the outer peripheral surface 32*d* of the second magnetic gap portion 32 may coincide with or substantially coincide with the geometric center of the through hole 42.

The following now describes an example method of manufacturing the coil component 1. In one or more embodiments of the present invention, the coil component 1 is manufactured by a sheet manufacturing method using magnetic sheets. The first step of manufacturing the coil component 1 using the sheet manufacturing method, a top laminate, an intermediate laminate, and a bottom laminate are formed. The top laminate will constitute the top cover layer 18, and the bottom laminate will constitute the bottom cover layer 19. The top laminate is formed by stacking a plurality of magnetic sheets, which are to form the magnetic layers 18*a* to 18*d*, the bottom laminate is formed by stacking a plurality of magnetic sheets, which are to form the magnetic layers 19*a* to 19*d*, and the intermediate laminate is formed by stacking a plurality of magnetic sheets, which are to form the magnetic layers 11 to 16. The magnetic sheets are produced, for example, by pouring a slurry, which is obtained by mixing and kneading metal magnetic particles with a resin, into a mold and applying a predetermined molding pressure thereon. The resin to be mixed and kneaded with the metal magnetic particles may be, for example, a polyvinyl butyral (PVB) resin, an epoxy resin, or any other highly insulating resins.

The intermediate laminate is formed by stacking a plurality of magnetic sheets having unfired conductor patterns formed thereon, which correspond to the conductor patterns C11 to C16. A through hole is formed in and penetrates in the stacking direction through each of the magnetic sheets prepared for forming the intermediate laminate, and a conductor paste is applied using screen printing or the like on the magnetic sheets having the through hole formed therein, so that the unfired conductor patterns are formed, which are to form the conductor patterns C11 to C16 after fired. During this processing, the through hole in each magnetic sheet is filled with the conductor paste so that unfired vias are formed, which are to be formed into the vias V1 to V5.

On the magnetic sheet having thereon the unfired conductor pattern to form the conductor pattern C11, an unfired magnetic gap layer to form the first magnetic gap portion 31 is formed. On the magnetic sheet having thereon the unfired conductor pattern to form the conductor pattern C16, an unfired magnetic gap layer to form the second magnetic gap portion 32 is formed. These unfired magnetic gap layers are formed on the magnetic sheets by applying onto the magnetic sheets a resin paste using screen printing or the like, and the resin paste is obtained by mixing and kneading a low-permeability material with a binder resin and a solvent. The unfired gap layers may be formed on the magnetic sheets before or after the unfired conductor patterns that are to form the conductor patterns C11 and C16 are formed. The unfired magnetic gap layers can be formed using techniques other than the screen printing. For example, a sheet member (a low-permeability sheet) may be formed in a sheet shape from a low-permeability material in advance, and this low-permeability sheet may be placed on the magnetic sheet at a predetermined position. This low-permeability sheet can be made from a resin paste obtained by mixing and kneading a low-permeability material with a binder resin and a solvent and using known techniques such as the doctor blade method. The low-permeability sheets are to be formed into the first and second magnetic gap portions 31 and 32 after heated. As already mentioned above, the low-permeable material can be glass, ceramics, non-magnetic ferrite, and a mixture of these, or a mixture of these and a magnetic material. In the above-described manner, the unfired conductor patterns, the unfired vias and the unfired magnetic gap layers are formed on the magnetic sheets, which are then stacked on each other to form the intermediate laminate.

Next, the intermediate laminate made in the above-described manner is sandwiched between the top laminate on the top side and the bottom laminate on the bottom side, and the top laminate and the bottom laminate are bonded to the intermediate laminate by thermal compression to obtain a body laminate. Next, the body laminate is diced into pieces of a desired size using a cutter such as a dicing machine or a laser processing machine to obtain chip laminates.

Next, the chip laminate is degreased and then heated. The heating is performed on the chip laminate at a temperature of 400° C. to 900° C. for a duration of 20 to 120 minutes, for example.

Following the heating, a conductive paste is applied to the surface of the chip laminate to form the external electrode 21 and the external electrode 22. The coil component 1 is thus obtained.

Alternatively, the coil component 1 may be manufactured by a method known to those skilled in the art other than the sheet manufacturing method, for example, a slurry build method or a thin film process method.

The illustrated laminated inductor is an example of the coil component worked with the invention. The invention can also be applied to various types of coil components other than laminated inductors. For example, the invention may be applied to planar coils.

The coil component relating to the present invention may be made not by the laminating process but by the compression molding process. When the coil component 1 is manufactured using the compression molding process, a slurry is first made by mixing and kneading together metal magnetic particles and a binder resin. In addition, low-permeability sheets shaped like a sheet are made from a low-permeability material. The low-permeability sheets can be made from a resin paste obtained by mixing and kneading the low-permeability material with a binder resin and a solvent and using known techniques such as the doctor blade method, as mentioned in the above description of the method of manufacturing the laminated inductor. Subsequently, the slurry is poured into a mold having a coil conductor placed therein until the slurry reaches the vicinity of the lower edge of the coil conductor, and one of the low-permeability sheets that is to form the second magnetic gap portion 32 is placed on the top surface of the slurry in this mold. The low-permeability sheet is positioned such that it is enclosed within the winding portion of the coil conductor. After this, the pouring of the slurry is resumed into the mold. The slurry is poured until it reaches the vicinity of the top edge of the coil conductor. Subsequently, the other low-permeability sheet, which is to form the first magnetic gap portion 31, is placed on the top surface of the slurry in the mold at the position aligned with the inside enclosed within the winding portion of the coil conductor. Following this, the slurry is further poured into the mold. Next, molding pressure is applied to the mold, so that a molded body having the coil conductor contained therein is obtained. Then, this molded body is subjected to heating, so that the magnetic body portion 10 is obtained. Next, the conductive paste is applied to the magnetic body portion 10, so that the external electrodes 21 and 22 are formed on the surface of the magnetic body portion 10. In the above-described manner, the coil component 1 is produced using the compression molding process.

Next, a description is given of the inductor characteristics of the coil component 1. For a simulation of the inductor characteristics, ten evaluation models (evaluation models #1 to #10) were created. Each of the valuation models #1 to #10 is a model of the coil component 1. Each evaluation model was created in the following manner in order to serve as a model of the coil component 1. The evaluation models #2 to #10 include a magnetic body portion made of a magnetic material and corresponding to the magnetic body portion 10, a coil conductor corresponding to the coil conductor 25, a first magnetic gap layer corresponding to the first magnetic gap portion 31, and a second magnetic gap layer corresponding to the second magnetic gap portion 32. The magnetic body portion had a relative permeability of 40, and the first and second magnetic gap portions had a relative permeability of 1. The evaluation model #1 was created without the first and second magnetic gap layers for the comparison purposes. In each evaluation model, the length (dimension in the L-axis direction) of the magnetic body portion was 1.5 mm, the width (dimension in the W-axis direction) was 1.35 mm, and the height dimension (dimension in the T-axis direction) was 0.5 mm. In each evaluation model, the coil conductor corresponding to the coil conductor 25 was wound 3.5 turns around the coil axis corresponding to the coil axis Ax and had a winding portion with oval outer and inner peripheral surfaces, when seen in the coil axis direction. In each evaluation model, the region enclosed within the winding portion had an area of 0.74 $mm^2$. The evaluation models #2 to #10 had first and second magnetic gap layers with a thickness of 5.75 μm, and the first and second magnetic gap layers were arranged such that the top surface of the first magnetic gap layer is flush with the top surface of the winding portion of the coil conductor in the coil axis direction and the bottom surface of the second magnetic gap layer is flush with the bottom surface of the winding portion of the coil conductor in the coil axis direction. In the evaluation models #2 to #10, the first and second magnetic gap layers were arranged within the winding portion of the coil conductor. The first and second magnetic gap layers had an oval outer peripheral surface extending along the inner peripheral surface of the winding portion of the coil conductor. In the evaluation models #2 to #9, an oval through hole corresponding to each of the through holes 41 and 42 was provided near the geometric center of a corresponding one of the first and second magnetic gap layers. The oval through hole was positioned such that the middle point between the two focal points defining the oval shape of the through hole substantially coincided with the geometric center of the winding portion of the coil conductor. In the evaluation model #10, no through hole was provided in the first and second magnetic gap layers for the comparison purposes. The size of the through hole provided in the first and second magnetic gap layers differs among the evaluation models. Table 1 shows the dimensions of the minor and major axes of the thorough hole and the area of the through hole in each evaluation model. Table 1 also shows the ratio of the area of through hole to the core area or the area of the region enclosed within the winding portion of the coil conductor and the ratio of the area of the first magnetic gap layer to the core area. The area of the second magnetic gap layer is equal to the area of the first magnetic gap layer and thus not indicated in Table 1.

TABLE 1

| Model Number | Minor Axis [mm] | Major Axis [mm] | Area of Through Hole [mm2] | Ratio of Area of Through Hole to Core Area | Ratio of Area of Gap Portion to Core Area |
|---|---|---|---|---|---|
| 1 | N/A | N/A | N/A | N/A | |
| 2 | 0.42 | 0.50 | 0.66 | 90 | 10.0 |
| 3 | 0.33 | 0.39 | 0.40 | 55 | 45.2 |
| 4 | 0.30 | 0.35 | 0.33 | 45 | 55.0 |
| 5 | 0.27 | 0.31 | 0.26 | 35 | 65.0 |
| 6 | 0.23 | 0.27 | 0.19 | 25 | 74.6 |
| 7 | 0.17 | 0.20 | 0.11 | 14 | 85.5 |
| 8 | 0.14 | 0.17 | 0.07 | 10 | 90.2 |
| 9 | 0.10 | 0.12 | 0.04 | 5 | 95.0 |
| 10 | 0.00 | 0.00 | 0.00 | 0 | 100 |

Figure 5:
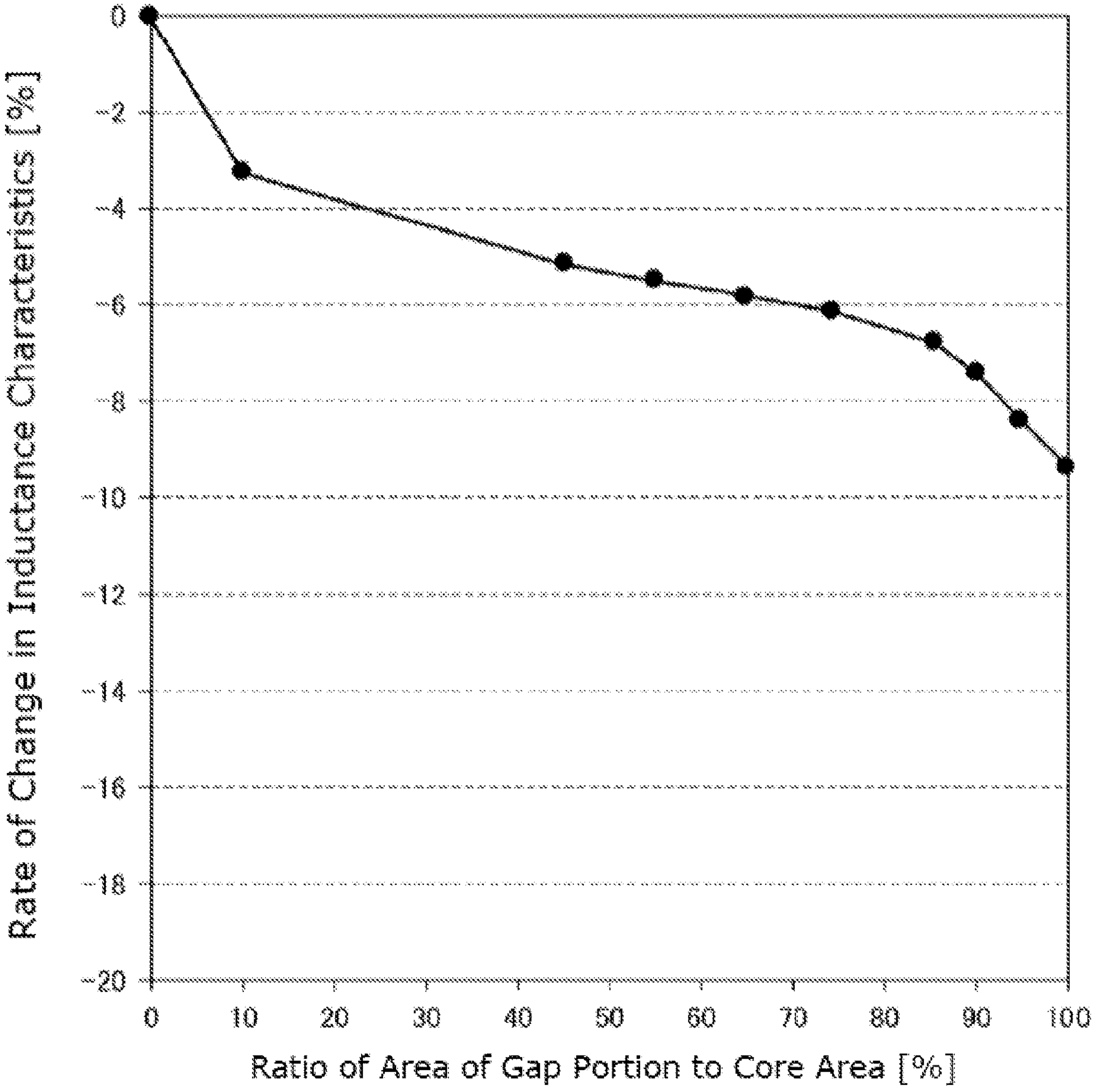
FIG. 5 is a graph showing how the ratio of the area of a magnetic gap layer to a core area is related to simulated inductance.
Figure 6:
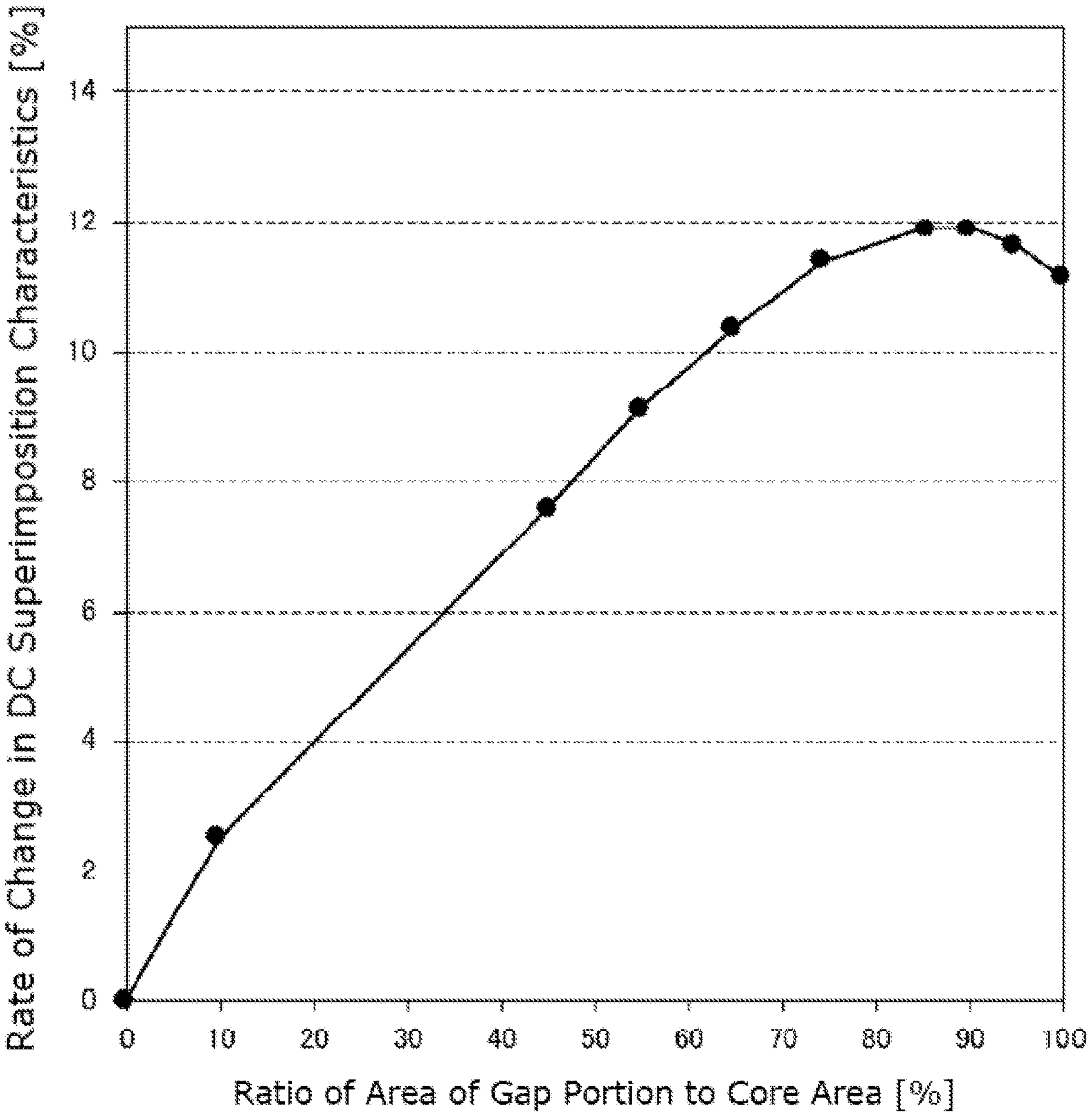
FIG. 6 is a graph showing how the ratio of the area of the magnetic gap layer to the core area is related to simulated DC superimposition characteristics.
Figure 7:
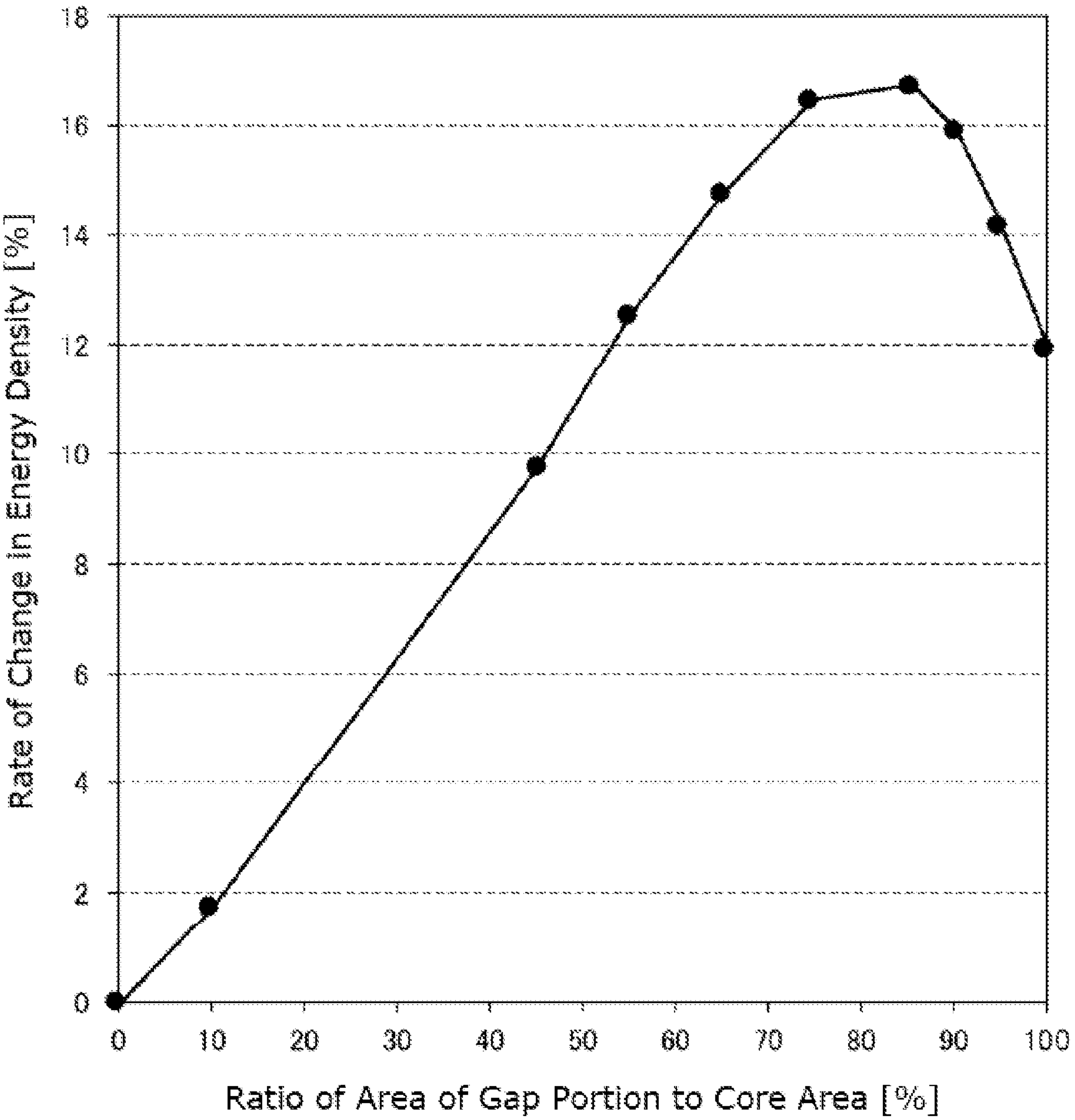
FIG. 7 is a graph showing how the ratio of the area of the magnetic gap layer to the core area is related to simulated energy characteristics.

For each of the evaluation models #1 to #10 created as described above, simulations were conducted to calculate the inductance L, the DC superimposition characteristics Idc, and the energy characteristics $LI^2/2$. The DC superimposition characteristics Idc represent the DC current values observed when the inductance drops at a given rate (for example, 30%) from its initial value. The initial value of the inductance of the coil component means the inductance of the coil component observed when no DC currents flow through the coil conductor. The DC superimposition characteristics may be referred to as the DC superimposition rated current or DC superimposition permissible current. The energy characteristics $LI^2/2$ represent the energy that can be stored on the coil component. The simulation results are shown in Table 2 and FIGS. 5 to 7. Table 2 shows the inductance L, the DC superimposition characteristics Idc and the energy characteristics $LI^2/2$ calculated for each evaluation model and additionally shows the rate of change in the inductance L, the DC superimposition characteristics Idc and the energy characteristics $LI^2/2$, which is calculated with reference to the corresponding values of the evaluation model #1. FIGS. 5 to 7 are graphs showing the simulated results of the rate of change in the inductance L, the DC superimposition characteristics Idc and the energy characteristics $LI^2/2$ of each evaluation model, which is calculated relative to the corresponding values of the evaluation model #1. In the graphs, the horizontal axis represents the ratio of the area of the gap layer to the core area. In FIG. 5, the vertical axis represents the rate of change in the inductance L of each evaluation model, which is calculated with reference to the corresponding value of the evaluation model #1. In FIG. 6, the vertical axis represents the rate of change in the DC superimposition characteristics Idc of each evaluation model, which is calculated with reference to the corresponding value of the evaluation model #1. In FIG. 7, the vertical axis represents the rate of change in the energy characteristics $LI^2/2$ of each evaluation model, which is calculated with reference to the corresponding value of the evaluation model #1.

TABLE 2

| Model Number | L [μH] | Idc [A] | Rate of Change in L | Rate of Change in Idc | Energy Charac-teristics | Rate of Change in Energy Characteristics |
|---|---|---|---|---|---|---|
| 1 | 0.31 | 3.95 | 0.00 | 0.00 | 4.84 | 0.00 |
| 2 | 0.3 | 4.05 | −3.23 | 2.53 | 4.92 | 1.74 |
| 3 | 0.294 | 4.25 | −5.16 | 7.59 | 5.31 | 9.79 |
| 4 | 0.293 | 4.31 | −5.48 | 9.11 | 5.44 | 12.53 |
| 5 | 0.292 | 4.36 | −5.81 | 10.38 | 5.55 | 14.76 |
| 6 | 0.291 | 4.4 | −6.13 | 11.39 | 5.63 | 16.48 |

TABLE 2-continued

| Model Number | L [μH] | Idc [A] | Rate of Change in L | Rate of Change in Idc | Energy Charac-teristics | Rate of Change in Energy Characteristics |
|---|---|---|---|---|---|---|
| 7 | 0.289 | 4.42 | −6.77 | 11.90 | 5.65 | 16.73 |
| 8 | 0.287 | 4.42 | −7.42 | 11.90 | 5.61 | 15.92 |
| 9 | 0.284 | 4.41 | −8.39 | 11.65 | 5.52 | 14.19 |
| 10 | 0.281 | 4.39 | −9.35 | 11.14 | 5.42 | 11.96 |

The graph shown in FIG. 5 proved that, as the ratio of the area of the first magnetic gap layer to the core area increases, the inductance L decreases.

The graph in FIG. 6 revealed that the evaluation models #2 to #9 having the magnetic gap layer with a through hole formed therein exhibit better DC superimposition characteristics Idc than the evaluation model #1 having no first and second magnetic gap layers. The evaluation models #2 to #9 exhibited better DC superimposition characteristics Idc than the evaluation model #1 probably because the first and second magnetic gap layers included in the evaluation models #2 to #9 may contribute to reduce magnetic saturation. As has been described above with reference to FIG. 5, the evaluation models #2 to #9 exhibit better inductance than the evaluation model #10. As described above, the evaluation models #2 to #9 having the magnetic gap layers with a through hole formed therein exhibit better DC superimposition characteristics Idc than the evaluation model #1 having no magnetic gap layers, and the better DC superimposition characteristics Idc can be achieved with it being possible to reduce the degradation in the inductance when compared with the conventional coil component having the magnetic gap layers covering the entire region enclosed within the winding portion of the coil conductor. The above evaluation results proved that, when the ratio of the area of the magnetic gap layer to the core area falls within the range of 0.1 to 0.95, the degradation in the inductance of the coil component can be reduced with it being possible to achieve improved DC superimposition characteristics when compared with the conventional coil component having no magnetic gap layers.

The simulation results also proved the following. Since the evaluation model #10 has first and second magnetic gap layers without a thorough hole formed therein, it exhibits excellent DC superimposition characteristics Idc. The evaluation models #6 to #9, however, exhibit further better DC superimposition characteristics Idc than the evaluation model #10. Since the evaluation model #10 has no through holes in the first and second magnetic gap layers, constant relative permeability is achieved in the region enclosed within the winding portion at any position irrespective of the distance from the winding portion. For this reason, in the evaluation model #10, fewer magnetic fluxes pass through the vicinity of the geometric center of the winding portion of the coil conductor. In the evaluation models #6 to #9, on the other hand, the through hole is provided in the first and second magnetic gap layers near their geometric center, and the magnetic fluxes are therefore encouraged to pass through the vicinity of the geometric center of the winding portion of the coil conductor. As noted, since the magnetic fluxes are encouraged to pass through the vicinity of the geometric center of the winding portion of the coil conductor in the evaluation models #6 to #9, this improves the uniformity of the magnetic flux distribution in the core region. As a result, the magnetic saturation can be further prevented in the core region. This may be the reason why the evaluation models

#6 to #9 can achieve better DC superimposition characteristics Idc than the evaluation model #10. The above evaluation results proved that, when the ratio of the area of the magnetic gap layer to the core area falls within the range of 0.8 to 0.95, the degradation in the inductance can be reduced with it being possible to improve the DC superimposition characteristics when compared with the conventional coil component having magnetic gap layers covering the entire region enclosed within the winding portion of the coil conductor.

Figure 8:
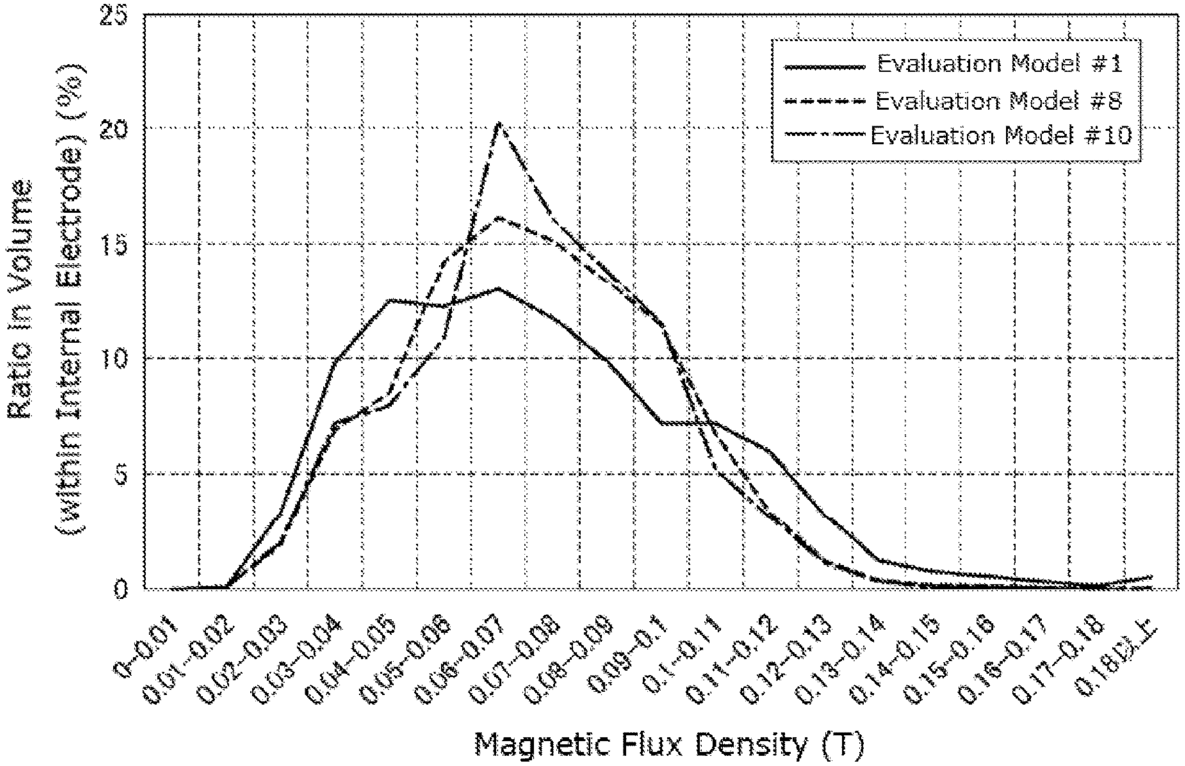
FIG. 8 is a graph showing a magnetic flux density distribution in a core region, which is calculated through simulations.

FIG. 8 shows the results of simulating the influence imposed by the through holes provided in the magnetic gap layers on the magnetic flux density distribution in the core region within the magnetic body portion. FIG. 8 is a graph showing the simulated results of the magnetic flux density distribution in the core region for the evaluation models #1, #8 and #10. In FIG. 8, a sharper graph means more uniform magnetic flux density distribution. As shown, the evaluation model #8 has a sharper magnetic flux density distribution than the evaluation models #1 and #10. This means that the evaluation model #8 may have the most uniform magnetic flux density distribution in the core region. As is clear from the above, it has been proved that a coil component having magnetic gap layers with a through hole formed therein can achieve more uniform magnetic flux density distribution in the core region than a coil component having no magnetic gap layers (for example, the evaluation model #1) and a coil component having magnetic gap layers without a through hole formed therein (for example, the evaluation model #10).

The graph in FIG. 7 revealed that the evaluation models #2 to #9 exhibit better energy characteristics than the evaluation model #1. This is explained in the following. Although the evaluation models #2 to #9 exhibit lower inductance than the evaluation model #1 as shown in the graph of FIG. 5, the evaluation models #2 to #9 exhibit better DC superimposition characteristics Idc than the evaluation model #1 as shown in the graph of FIG. 6. Here, the difference in DC superimposition characteristics Idc is likely to affect more greatly the energy characteristics than the difference in inductance L. It was also revealed that the evaluation models #4 to #9 exhibit better energy characteristics than the evaluation model #10. More specifically, it was confirmed that the energy characteristics peaked near the evaluation model #7 (the ratio of the area of the gap portion to the core area is approximately 0.85). This can be explained as follows. Until the ratio of the area of the gap portion to the core area reaches approximately 0.85, the inductance gradually decreases as shown in FIG. 5 but the DC superimposition characteristics Idc significantly improves as shown in FIG. 6. After the ratio of the area of the gap portion to the core area exceeds approximately 0.85 and until it reaches 1.0, on the other hand, the inductance significantly decreases as shown in FIG. 5 but the DC superimposition characteristics Idc hardly improves or even deteriorates as shown in FIG. 6. The above evaluation results proved that, when the ratio of the area of the magnetic gap layer to the core area falls within the range of 0.55 to 0.95, the degradation in the inductance can be reduced with it being possible to improve the energy characteristics when compared with the conventional coil component having the magnetic gap layers covering the entire region enclosed within the winding portion of the coil conductor.

Advantageous effects of the embodiments will be now described. In the coil component 1 relating to one or more embodiments of the present invention, the first and second magnetic gap portions 31 and 32 made of a low-permeability material respectively have the through holes 41 and 42. Therefore, the coil component 1 can achieve better DC superimposition characteristics than the conventional coil component without such magnetic gaps made of a low-permeable material.

Furthermore, in the above-described coil component 1, the first and second magnetic gap portions 31 and 32 respectively have the through holes 41 and 42 and the magnetic fluxes can pass through the through holes 41 and 42. Accordingly, the coil component 1 can reduce the degradation in the inductance when compared with the conventional coil component having the magnetic gap layers covering the entire region enclosed within the inner peripheral surface of the winding portion of the coil conductor. As a result, the coil component 1 relating to one or more embodiments of the present invention can reduce the degradation in the inductance while improving the DC superimposition characteristics.

In the coil component 1 relating to one or more embodiments of the present invention, the geometric center of the winding portion 25*a* is positioned within the through holes 41 and 42. Accordingly, the magnetic fluxes are encouraged to pass through the vicinity of the geometric center of the winding portion 25*a*. In this manner, the coil component 1 can achieve more uniform magnetic flux density distribution in the core region 10A. Accordingly, the coil component 1 can achieve improved DC superimposition characteristics when compared with the conventional coil component including the magnetic gap layers with no through holes formed therein.

In the conventional coil component having the magnetic gap layers, the magnetic body portion is made of a different material from the magnetic gap portions. Accordingly, the difference in thermal expansion constant between the magnetic body portion and the magnetic gap layers is likely to cause the magnetic gap layers to separate from the magnetic body portion in a high temperature environment experienced by the coil component during the heating step of the manufacturing process and while the coil component is used. For this reason, in the conventional coil component, the magnetic gap layers are likely to separate from the magnetic body portion, which may create micro-cracks between the magnetic gap portions and the magnetic body portion. Such micro-cracks can result in deterioration of the inductance and mechanical strength of the coil component. In one or more embodiments of the present invention, on the other hand, the through hole 41 in the first magnetic gap portion 31 is closed by the connecting portion, which is a portion of the magnetic body portion 10. Therefore, the core region 10A below the first magnetic gap portion 31 is connected to the top cover layer 18 above the first magnetic gap portion 31 through the connecting portion closing the through hole 41. For this reason, the first magnetic gap portion 31 is unlikely to separate from the magnetic body portion 10. Similarly, the through hole 42 in the second magnetic gap portion 32 is closed by the connecting portion of the magnetic body portion 10. Accordingly, the second magnetic gap portion 32 is also unlikely to separate from the magnetic body portion 10. This can prevent micro-cracks from being formed between the first magnetic gap portion 31 and the magnetic body portion 10 and between the second magnetic gap portion 32 and the magnetic body portion 10. As a result, the one or more embodiments of the present invention can partly or completely prevent the degradation in the inductance and mechanical strength of the coil component, which can result from the magnetic gap portions.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

What is claimed is:

1. A coil component comprising:

an insulating base body including a magnetic body portion and a magnetic gap portion, the magnetic body portion being made of a magnetic material, and the magnetic gap portion being made of a low-permeability material having a lower relative permeability than the magnetic material; and a coil conductor having a winding portion extending around a coil axis, the coil conductor being arranged in the base body, the winding portion including a plurality of conductor patterns arranged along the coil axis, the plurality of conductor patterns including one or two first conductor patterns disposed at a top edge of the winding portion, one or two second conductor patterns disposed at a bottom edge of the winding portion, and one or more third conductor patterns disposed between the one or two first conductor patterns and the one or two second conductor patterns, wherein the magnetic gap portion is shaped like a ring when seen in a direction along the coil axis and arranged within the winding portion such that an outer peripheral surface of the magnetic gap portion is in contact with an inner peripheral surface of at least one of: (i) the one or two first conductor patterns or (ii) the one or two second conductor patterns, the insulating base body including no magnetic gap portion in contact with the one or more third conductor patterns, and wherein the magnetic body portion includes:

a first region positioned within the winding portion;

a second region positioned opposite the first region with respect to the magnetic gap portion in the direction along the coil axis; and a third region arranged within a through hole defined by an inner peripheral surface of the magnetic gap portion such that the third region is in contact with the inner peripheral surface of the magnetic gap portion, the third region connecting together the first and second regions.

2. The coil component of claim 1, wherein, when seen in the direction along the coil axis, a ratio of an area of the magnetic gap portion to an area of a region enclosed within the winding portion is within a range of 0.1 to 0.95.

3. The coil component of claim 2, wherein, when seen in the direction along the coil axis, the ratio of the area of the magnetic gap portion to the area of the region enclosed within the winding portion is within a range of 0.55 to 0.95.

4. The coil component of claim 1, wherein, when seen in the direction along the coil axis, a geometric center of the winding portion is positioned within the through hole.

5. The coil component of claim 1, wherein a relative permeability of the low-permeability material is a tenth part or less of a relative permeability of the magnetic material.

6. The coil component of claim 1, wherein the magnetic body portion contains a plurality of metal magnetic particles.

7. The coil component of claim 1, wherein the magnetic gap portion includes a first magnetic gap layer and a second gap layer spaced away from the first magnetic gap layer in the direction along the coil axis.

8. A circuit board comprising the coil component of claim 1.

9. An electronic device comprising the circuit board of claim 8.

* * * * *